April 18, 1961  M. FRACHON  2,980,825
TIME SWITCHES AND THE LIKE
Filed Aug. 4, 1958  2 Sheets-Sheet 1

INVENTOR.
Marc Frachon
BY Alexander Dowell
ATTORNEY

April 18, 1961 M. FRACHON 2,980,825
TIME SWITCHES AND THE LIKE
Filed Aug. 4, 1958 2 Sheets-Sheet 2

INVENTOR.
Marc Frachon
BY Alexander Nowell
attorney ns Patent Office
2,980,825
Patented Apr. 18, 1961

2,980,825
TIME SWITCHES AND THE LIKE

Marc Frachon, La Pierre Souveraine, Saint-Genis-Laval, France

Filed Aug. 4, 1958, Ser. No. 753,003
Claims priority, application France Aug. 13, 1957
3 Claims. (Cl. 317—141)

This invention relates to electrical apparatus of the kind of the so-called time switches, wherein one or several external electric circuits are controlled in a pre-determined time relation. A typical example of such an apparatus is the conventional time switch which closes a lighting circuit for a given time when it has been actuated by a push-button.

The apparatus of the present invention includes a device of the kind disclosed in my prior application Ser. No. 690,361, now Patent No. 2,912,530. Such a device comprises a driving cam rotated by an electric motor and which oscillates against biassing means a micro-switch unit the actuating button of which engages an adjustable abutment during the return stroke of the micro-switch unit under the action of its biassing means. In the aforesaid patent application the driving electric motor rotates continuously at a constant speed and the device is used for controlling the power in an electric heating apparatus or the like.

In accordance with the present invention in an electrical apparatus adapted to close an external electric circuit for a predetermined time, and comprising a driving cam rotated by an electric motor, the cam, in the form of an arc of a spiral, oscillates against biassing means a micro-switch unit the actuating button of which engages at rest an adjustable abutment, means are provided for starting the said motor at a pre-determined position of rest of the driving cam, for thereafter maintaining the said motor in operation and for stopping the latter when the driving cam re-assumes its position of rest, and means are also provided for closing the external circuit under control of the micro-switch unit as soon as the motor is rotating.

Figure 1:
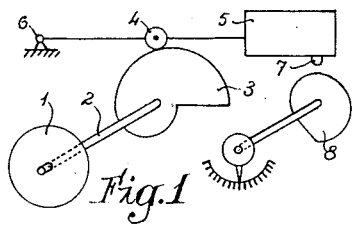
Fig. 1 is a very diagrammatical perspective view showing the essential elements of an apparatus according to this invention.

The device illustrated in Fig. 1 comprises an electric motor 1 the shaft of which carries a driving cam 3 which engages a roller 4 carried by a micro-switch unit 5 pivoted at 6. The spring which maintains this roller 4 against the driving cam 3 has not been illustrated; it may be supposed that the weight of the micro-switch unit is sufficient for this purpose. It will be noted that the driving cam 3 is in the form of an arc of a spiral with a sharp radial junction between the ends of this arc. The actuating button 7 of the micro-switch unit 5 is disposed above an adjustable regulating cam 8 in such a manner that this button may engage the said cam when the driving cam 3 permits lowering of the micro-switch unit.

Figure 2:
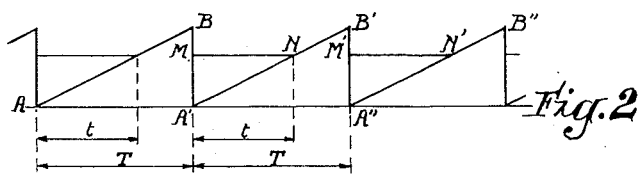
Fig. 2 is an explanatory diagram illustrating the operation of this apparatus.

Supposing at first that the regulating cam 8 be suppressed, the driving cam 3, if rotating continuously at a constant speed, would oscillate the micro-switch 5 according to the illustrative curve A, B, A', B', A", B", etc. of Fig. 2. The action of the regulating cam 8 is to retain the micro-switch unit at a point M when roller 4 falls from the uppermost point of cam 3, the height at which the micro-switch is retained, i.e. the ordinate of point M, varying in accordance with the angular position of the regulating cam 8. When the micro-switch is thus retained by cam 8, roller 4 is of course disengaged from the driving cam 3; it is thereafter re-engaged by the latter at point N and it is again raised, the button 7 leaving the regulating cam 3.

Since the said button 7 closes the internal electric contacts of the switch, the latter are closed from M to N, i.e. during the time $t$ of Fig. 2, while the period of the cycle is A, A' or T.

In accordance with the present invention in order to transform the above-described device into a time switch adapted to control an external circuit, there is associated to the said device an appropriate arrangement of electric circuits and/or relays in such a manner that (a) the motor is started when an actuating push button or like electric contact is closed, (b) the motor remains in operation after the push button is released, (c) the motor is stopped when the driving cam has re-assumed its initial starting position or position of rest, and (d) starting of the electric motor closes the external circuit through the micro-switch unit, this circuit being thus closed from M to N and thereafter remaining open when the electric motor stops at the end of the cycle, as for instance at A".

These conditions may be realized by means of a large number of arrangements of electric circuits and/or relays.

Figure 3:
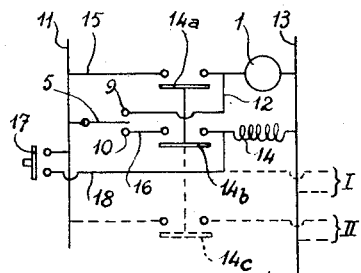
Fig. 3 is a diagram of electric circuits adapted to ensure the operation of the apparatus of Fig. 1 by means of an electric relay.

In the arrangement of Fig. 3, reference numeral 5 indicates the inner movable blade of the micro-switch unit which is in the form of a conventional two-way push-button switch, without an intermediate position. Blade 5 thus co-operates with two contacts 9 and 10; it is biassed towards contact 9, whereby it may be said that the switch has a stable position (corresponding to engagement of blade 5 against contact 9) and an unstable position (corresponding to engagement of blade 5 against contact 10). Contact 9 will therefore be termed the stable contact and contact 10 the unstable contact of the micro-switch. Blade 5 is connected with the first main line wire 11. The stable contact 9 is connected by a wire 12 with one of the terminals of the electric motor 1 the other terminal of which is connected with the second main line wire 13. The arrangement further includes a relay having a coil 14 and two movable contacts 14a and 14b. Contact 14a closes a circuit comprising a wire 15 which leads directly to motor 1, while contact 14b is disposed on a wire 16 which connects the unstable contact 10 of the micro-switch with one of the terminals of coil 14, the other terminal thereof being directly connected with the second main line wire 13. The push-button 17 closes a circuit 18 which leads to coil 14.

At the position of rest, i.e. at point M of Fig. 2, the actuating button 7 of the micro-switch 5 rests on the regulating cam 8 and consequently the movable blade 5 of Fig. 3 bears against the unstable contact 10. Motor 1 and coil 14 are unenergized. If the push-button 17 is pressed for a very short period of time, coil 14 is excited and the movable relay contacts 14a and 14b are brought to the closed position, whereby motor 1 is operated while coil 14 is directly connected to the first main line wire 11 through contact 10. The relay therefore remains at the closed position when push-button 17 is released. At point N the actuating button 7 of the micro-switch leaves the regulating cam 8 and blade 5 therefore moves from the unstable contact 10 to the stable contact 9. Coil 14 is no more energized and therefore the relay opens, but motor 1 is still energized through wire 12. At point B' roller 4 falls from the uppermost point of the driving cam 3, the actuating button 7 of the micro-switch re-engages the regulating cam 8 and the movable blade 5 therefore returns from the stable contact 9 to the unstable contact 10. The parts are thus again at their initial or starting position and the driving motor is stopped.

The external circuit controlled by the switch may be connected between wire 18 and the second main line wire 13 (circuit indicated by the dash lines I), or this circuit may also be closed by an additional movable contact 14c of the relay (circuit II), etc.

Figure 4:
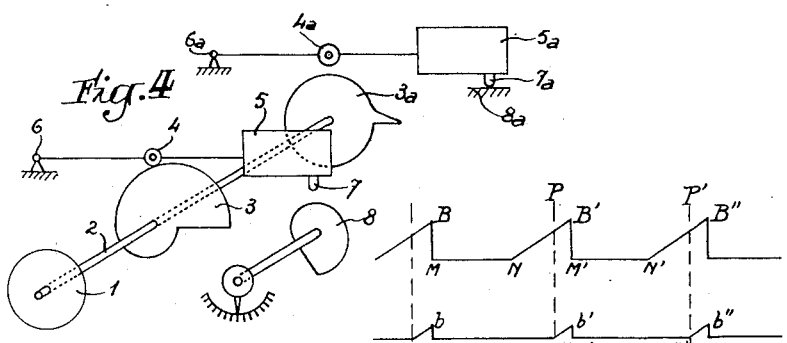
Fig. 4 is a diagrammatical perspective view showing an embodiment of an apparatus according to the invention operating without any kind of relay.

Fig. 4 illustrates another embodiment which dispenses with any kind of relay. The apparatus of Fig. 4 comprises an auxiliary driving cam 3a carried by shaft 2, the said cam being in the form of a disc having a very short ratchet tooth with the radial edge facing rearwardly. This auxiliary cam acts on a roller 4a carried by an auxiliary micro-switch unit 5a pivoted at 6a. The actuating button 7a of this auxiliary micro-switch co-operates with a fixed abutment 8a.

With such an apparatus the oscillating movement of the main micro-switch 5 is illustrated by the broken line B, M, N, B', M', N', B'', etc. as in Fig. 2. The movement of the auxiliary micro-switch 5a is illustrated by a somewhat similar line b, m, n, b', m', n', b'', etc. wherein the times during which the micro-switch is raised are extremely short. t and t' respectively represent the times during which micro-switches 5 and 5a are closed.

Figure 6:
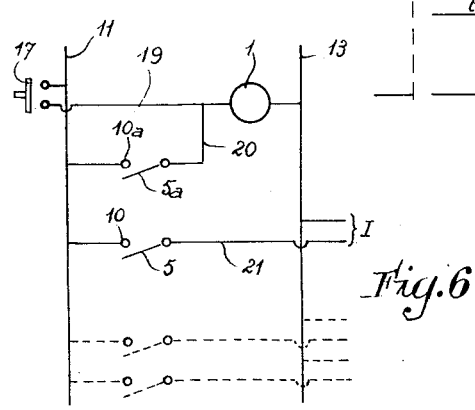
Fig. 6 is a diagram of the electric circuits of this apparatus.

The wiring diagram may be as indicated in Fig. 6. The push-button 17 directly energizes motor 1 through wire 19. Motor 1 may also be connected with the first main line wire 11 through the movable blade 5a of the auxiliary micro-switch, the corresponding unstable contact 10a and wire 20. The movable blade of the main micro-switch 5 and the corresponding unstable contact 10 are disposed on a wire 21 which leads from line wire 11 to the external circuit I to be controlled.

Figure 5:
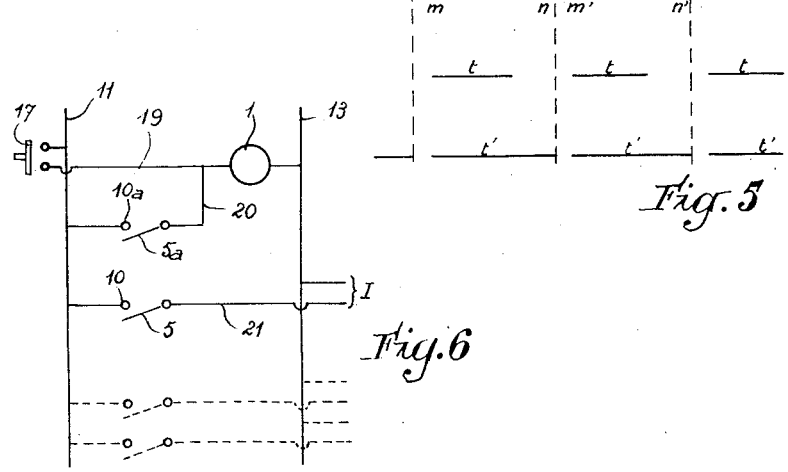
Fig. 5 is an explanatory diagram corresponding to the operation of the apparatus of Fig. 4.

The vertical line P in Fig. 5 illustrates the position of rest or initial position of the apparatus. Line P passes through point n, where the auxiliary micro-switch 5a has just been raised and has opened the circuit of motor 1. The main micro-switch 5 is also raised, its roller 4 being almost on the uppermost point of the main driving cam 3, and the external circuit I is open. If the push-button 17 is pressed for a very short time, motor 1 is energized through wire 19. Almost as soon as motor 1 is started, the vertical B', M', b', m' is reached and both micro-switches 5 and 5a fall and close substantially at the same time. Closure of the auxiliary micro-switch 5a ensures operation of motor 1 when push-button 17 is released. Closure of the main micro-switch 5 closes the external circuit I. At point N' the main micro-switch 5 is raised by the main driving cam 3 and it opens the external circuit I. At point n' the auxiliary micro-switch 5a is raised whereby the electric circuit of motor 1 opens. The apparatus is again at its position of rest at P'.

It will be understood that with such an arrangement shaft 2 could carry a second cam 3 actuating a second micro-switch 5 associated with a second regulating cam 8 and which would control a second external circuit whose operative time of which could be adjusted at will independently of the first one. It would of course be possible to add a third driving cam, etc., as very diagrammatically indicated in dash lines in Fig. 6. The apparatus thus permits of controlling any desired number of external circuits with independently adjustable operating times t.

It will further be appreciated that the adjustable regulating cams such as 8 may be replaced by regulating screws or other adjustable abutments.

Referring again to Fig. 2, it will be seen that when the useful time t is ended, an additional or residual time T−t is required before the time switch re-assumes its initial starting position. According to the invention this may be avoided when desired by rotating the driving cam successively at two algebraically different speeds during the operating cycle or period of the apparatus.

Figure 7:
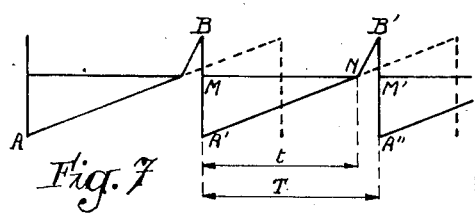
Fig. 7 illustrates the operation of another embodiment wherein the driving cam is rotated at two different speeds in the same direction.

In a first embodiment these two speeds are in the same direction but of widely different absolute values. The first speed, or lower speed is used from M to N (see Fig. 7); from point N to point B the cam is rotated at the second speed or higher speed whereby N–B corresponds to a relatively very short time. This permits of reducing the residual time T−t to a small value which may be considered as negligible in most instances. Fig. 7 shows in dash lines what would be the operation if the driving cam were continuously rotated at the lower speed.

Figure 8:
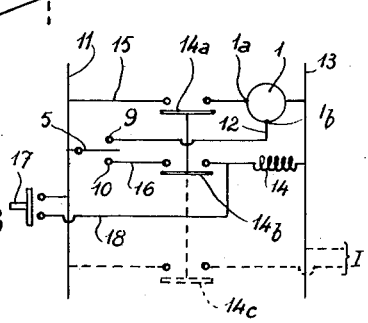
Fig. 8 shows the electric circuits adapted to ensure the operation illustrated in Fig. 7.

This rotation of the driving cam at two different speeds in the same direction may be realized in a large number of ways. The embodiment illustrated in Fig. 8 may be readily deduced from Fig. 3. In Fig. 8 the driving motor 1, which is adapted to operate at two speeds, has a first inlet terminal 1a for the lower speed and a second inlet terminal 1b for the higher speed. Terminal 1a is connected with wire 15 through relay contact 14a, while terminal 1b is connected with wire 12. From M to N (useful time t) motor 1 is energized through wire 15 and therefore rotates at the lower speed, while during the residual time from N to B' it is energized through wire 12 and rotates at the higher speed.

It would of course be possible to imagine other diagrams comprising electric relays and/or auxiliary micro-switches.

In another embodiment the driving cam is successively rotated at two speeds in opposed direction, i.e. at a positive speed and at a negative speed, the absolute values of these speeds being equal or unequal. It will thereafter be supposed that these values are equal or, in other words, that the speeds are arithmetically equal but algebraically different.

Figure 9:
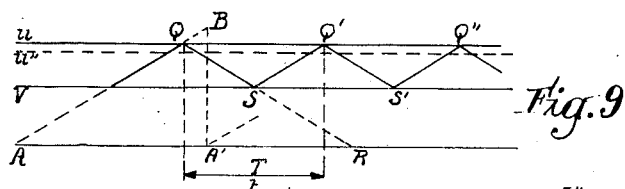
Fig. 9 is a diagram illustrating the operation of an apparatus according to this invention wherein the driving cam is rotated at two different speeds in opposed directions.

If the driving cam were continuously rotating in the same direction the operation of the micro-switch would be illustrated by line A, B, A' of Fig. 9, as in the case of Fig. 2. But if the direction of rotation is reversed at point Q, subsequent movement of the micro-switch will take place along the straight line QR which is oblique as line AQ, but in the reverse direction. If rotation of the driving cam is again reversed at point S, then the operation of the micro-switch will finally correspond to the broken see-saw line Q, S, Q', S', Q'', etc. comprised between horizontal lines U and V. The period T of the operating cycle may for instance be taken between points Q, Q'; Q', Q''; etc. This period may be varied at will by vertically displacing either one of lines U and V. This possibility of varying the period T permits of taking the period itself as the useful time t of the switch or, in other words, of making t=T. It will be appreciated that with such an arrangement the apparatus directly re-assumes its initial or starting position at the end of the useful time

*t*, which is tantamount to say that the residual time T–*t* is wholly suppressed.

Figure 10:
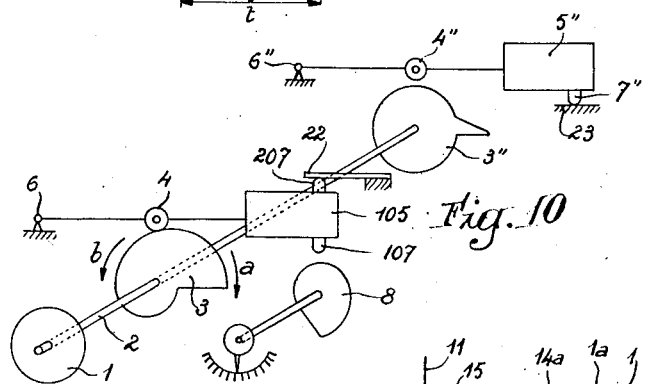
Fig. 10 is a diagrammatical perspective view of an apparatus corresponding to the operation illustrated in Fig. 9.

Fig. 10 shows a possible embodiment of an apparatus adapted to realize the operating cycle of Fig. 9. This apparatus comprises the main elements or parts of Fig. 1, namely the driving motor 1 (which is here reversible), the driving cam 3 and its roller 4, and the oscillating micro-switch unit pivoted at 6; but in the present case the micro-switch, which has been referenced 105, is of a somewhat particular type. While the micro-switch 5 of Fig. 1 (or 5*a* of Fig. 4) was of the conventional construction wherein the movable blade is continuously biassed towards one of its two positions, i.e. where in there is provided a stable position and an unstable position, the micro-switch 105 of Fig. 10 has two stable positions, i.e. its movable blade is resilently pressed against any one of the corresponding contacts. Micro-switch 105 is provided with two opposed buttons 107 and 207 adapted to actuate its inner blade towards one and the other of the two stable positions above referred to. The lower actuating button 107 cooperates with the regulating cam 8, while the upper actuating button 207 cooperates with a fixed abutment 22. The apparatus further comprises an auxiliary driving cam 3″ having a single tooth which raises the roller 4″ of an auxiliary micro-switch unit 5″ pivoted at 6″, the actuating button 7″ of this micro-switch resting on a fixed abutment 23. Micro-switch 5″ is of the conventional construction with a single stable position, as micro-switch 5 of Fig. 1.

Figure 11:
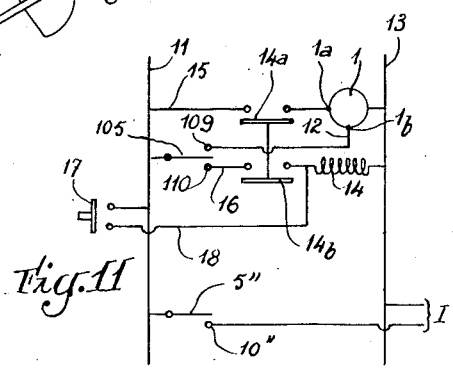
Fig. 11 shows the electric circuits adapted to ensure the operation of the apparatus of Fig. 10.

The wiring diagram may be as illustrated in Fig. 11. This diagram is quite similar to the diagram of Fig. 8, but the movable blade of the main micro-switch has been referenced 105 to correspond to Fig. 10, the corresponding contacts being referenced 109 and 110 (blade 105 being brought against contact 109 by button 207 and against contact 110 by button 107). Moreover motor 1 is a reversible motor, i.e. a motor adapted to rotate at two speeds of equal value but in opposed directions, while in Fig. 8 motor 1 was adapted to rotate at two speeds of different values in the same direction. In Fig. 11, reference numeral 1*a* corresponds to the inlet terminal for rotation in one direction (negative speed corresponding to Q, S) and reference numeral 1*b* to the inlet terminal for rotation in the other direction (positive speed corresponding to S, Q′). Micro-switch 5″ comprises a single operative contact 10″ which controls the external circuit I.

At point Q the micro-switch 105 has been raised, its upper actuating button 207 has been depressed and its movable blade 105 is therefore applied against contact 110. The apparatus is at its position of rest. Actuation of push-button 17 closes relay 14 which remains excited through blade 105, contact 110, wire 16 and relay contact 14*b* when push-button 17 is released. The circuit of motor 1 is closed through wire 15, relay contact 14*a* and inlet terminal 1*a*, whereby motor 1 rotates in the negative direction (clockwise in Fig. 10 as indicated by arrow *a*). Micro-switch 105 is therefore lowered as indicated by line Q, S of Fig. 9, but its movable blade remains pressed against contact 110. At point S the lower actuating button 107 engages the regulating cam 8 and blade 105 is therefore displaced from contact 110 to contact 109. Relay 14 opens and motor 1 is energized through inlet terminal 1*b* corresponding to the positive speed, whereby cam 3 is rotated in anticlockwise direction (arrow *b*). The micro-switch unit is raised as illustrated by line S, Q′. At point Q′ button 207 is actuated by abutment 22 and the apparatus is again at its initial position of rest. The operating period may be adjusted at will be means of the regulating cam 8 which determines the height of the horizontal line V (Fig. 3).

The auxiliary micro-switch 5″ is only used to control the external circuit I. Micro-switch 5″ is normally closed, but it is opened during a very short time by the single tooth of cam 3″. Cam 3″ is so timed that its tooth raises roller 4″ just before point Q or Q′, Q″, etc. of the diagram of Fig. 9 wherein the action of this cam is illustrated by the horizontal line U‴. The external circuit is therefore open at the end of an operating period and at the beginning of the next one, i.e. when the apparatus is at rest. As soon as it is started, the very short tooth of cam 3″ releases roller 4″ whereby the external circuit is closed almost at once. Since this circuit is only opened just before the apparatus stops, it will be appreciated that for practical purposes the useful time *t* may be considered as equal to the operating period T.

I claim:

1. A time switch adapted to close an external circuit for an adjustable time, comprising an electric driving motor unit having a first speed and a second speed of same direction as said first speed but of higher value; a driving cam rotated by said motor unit, said cam being in the form of an arc of a spiral with a substantially radial junction between its outermost and its innermost point and said junction facing rearwardly with respect to the direction of rotation of said cam by said motor unit; a pivotally mounted micro-switch unit oscillated by said driving cam, said micro-switch unit embodying an actuating press-button and inner two-way snap acting contact system with a single stable position and an unstable position, actuated by said press-button to be brought to its unstable position when said press-button is pressed, said system comprising a first set of contacts which are closed at the stable position of said system and open at the unstable position thereof, and a second set of contacts which are open at the stable position of said system and closed at the unstable position thereof, said first set of contacts being connected with said motor unit to cause same to rotate at said second speed; means tending to maintain said micro-switch unit in engagement with said driving cam; a normally stationary but adjustable regulating abutment in front of said actuating button, said abutment and said button being so arranged that said button engages said abutment during the return stroke of said micro-switch unit from the outermost point of said driving cam to cause said inner snap acting contact system to pass from its stable position to its unstable position under the action of said press-button; a relay having a relay coil and a plurality of relay contacts actuated by said coil, said coil being energized in series through a first one of said relay contacts and through said second set of contacts of the inner snap acting contact system of said micro-switch unit, and a second one of said relay contacts closing a circuit to energize said motor unit to cause same to rotate at said first speed; and a controlling contact to temporarily energize the coil of said relay to close the contacts of same and thereby to start said motor unit at said first speed and to rotate said driving cam, until said micro-switch unit is raised by said driving cam to bring said inner snap acting contact system to its stable position to cause the second set of contacts thereof to open and the first set of contacts thereof to close to rotate said motor unit at said second speed until the return stroke of said micro-switch unit.

2. In a time switch as claimed in claim 1, said relay having a third contact to control said external circuit.

3. A time switch adapted to close an external circuit for an adjustable time, comprising an electric driving motor unit having a first speed and a second speed of same direction as said first speed but of higher value; a driving cam rotated by said motor unit, said cam being in the form of an arc of a spiral with a sharp radial junction between its outermost and its innermost point and said junction facing rearwardly with respect to the direction of rotation of said cam; a pivotally mounted micro-switch unit oscillated by said driving cam, said micro-switch unit embodying an actuating press button and inner snap-acting contacts actuated by said button; means to urge said micro-switch unit into engagement with said cam; a normally stationary but adjustable regulating abutment in front of said actuating button, said abutment and said button being so arranged that said button engages said abutment during the return stroke of said micro-switch unit from the outermost point of said driving cam to limit said return stroke and to cause actuation of said inner contacts; rotation initiating means electrically connected with said motor unit and responsive to a transient actuation to start said motor insert at said first speed when said cam is at its position of rest as determined by engagement of the button of said micro-switch unit with said regulating abutment at the end of the return stroke of said micro-switch unit as limited by said abutment; rotation maintaining means actuated by said rotation initiating means to maintain said motor unit in operation for a full revolution of said driving cam once said motor has been started; means actuated by the inner snap-acting contacts of said micro-switch unit when the actuating button thereof is raised from said regulating abutment during the revolution of said driving cam to cause rotation of said motor unit to change from said first speed to said second speed; and means actuated by the inner snap-acting contacts of said micro-switch unit when the actuating button thereof re-engages said regulating abutment after a full revolution of said driving cam to cause disenergization of said motor unit.

References Cited in the file of this patent

UNITED STATES PATENTS

| | | |
|---|---|---|
| 1,941,377 | Woodworth | Dec. 26, 1933 |
| 2,100,284 | Kriechbaum | Nov. 23, 1937 |
| 2,307,567 | Coggeshall | Jan. 5, 1943 |
| 2,736,844 | Kercher | Feb. 28, 1956 |
| 2,799,811 | Lindars | July 16, 1957 |
| 2,855,476 | Garrard | Oct. 7, 1958 |
| 2,912,530 | Frachon | Nov. 10, 1959 |

FOREIGN PATENTS

| | | |
|---|---|---|
| 494,166 | Great Britain | Oct. 20, 1938 |